(12) United States Patent
Hairston et al.

(10) Patent No.: US 12,411,931 B2
(45) Date of Patent: Sep. 9, 2025

(54) FUEL DISPENSER AUTHORIZATION AND CONTROL

(71) Applicant: Wayne Fueling Systems LLC, Austin, TX (US)

(72) Inventors: Hob Hairston, Cedar Park, TX (US); Anil Kumar Peddireddy, Lombardi, IL (US); Dinesh Kumar, McKinney, TX (US); Aneesh Maria Stephen, Tamil Nadu (IN)

(73) Assignee: Wayne Fueling Systems LLC, Austin, TX (US)

( * ) Notice: Subject to any disclaimer, the term of this patent is extended or adjusted under 35 U.S.C. 154(b) by 285 days.

(21) Appl. No.: 17/711,272

(22) Filed: Apr. 1, 2022

(65) Prior Publication Data

US 2023/0315831 A1    Oct. 5, 2023

(51) Int. Cl.
*G06F 21/44*    (2013.01)

(52) U.S. Cl.
CPC .................................. *G06F 21/44* (2013.01)

(58) Field of Classification Search
CPC ........ G06F 21/44; G06Q 20/20; H04J 3/1617; G05B 19/42
See application file for complete search history.

(56) References Cited

U.S. PATENT DOCUMENTS

| | | | |
|---|---|---|---|
| 9,739,419 B2 | 8/2017 | Donnelly et al. | |
| 10,140,645 B2 | 11/2018 | Driscoll et al. | |
| 10,360,647 B2 | 7/2019 | Pallas et al. | |
| 10,726,508 B2 | 7/2020 | Morris et al. | |
| 2002/0083011 A1* | 6/2002 | Kobayashi | G07F 17/16 705/64 |
| 2007/0261760 A1* | 11/2007 | Harrell | B67D 7/08 141/197 |
| 2009/0048945 A1 | 2/2009 | Deline et al. | |
| 2009/0089214 A1* | 4/2009 | Weston | G07F 13/025 705/73 |
| 2011/0213683 A1* | 9/2011 | Betancourt | G06Q 40/12 705/30 |
| 2013/0269020 A1* | 10/2013 | Griffin | H04L 63/083 726/9 |

(Continued)

*Primary Examiner* — Alexander Lagor
*Assistant Examiner* — Taylor P Vu
(74) *Attorney, Agent, or Firm* — Mintz, Levin, Cohn, Ferris, Glovsky and Popeo, P.C.

(57) ABSTRACT

In one aspect, a method includes establishing a first communication channel between a first computing device associated with a fuel dispenser user and a second computing device configured within a fuel dispenser. The method can further include receiving, by the second computing device, first data characterizing a first authorization of the fuel dispenser user of a fuel dispenser. The method also includes determining, by the second computing device, a second authorization of the fuel dispenser user based on the first data. The method further includes controlling, by the second computing device and based on the second authorization, operation of the fuel dispenser to dispense fuel. The method also includes providing, by the second computing device via the first communication channel, second data characterizing the operation of the fuel dispenser to the first computing device. Related apparatus, systems, and articles are also described.

24 Claims, 5 Drawing Sheets

(56) References Cited

U.S. PATENT DOCUMENTS

| | | | | |
|---|---|---|---|---|
| 2014/0089078 | A1* | 3/2014 | Dessert | G06Q 30/0238 |
| | | | | 705/14.38 |
| 2015/0105920 | A1* | 4/2015 | Carapelli | G06Q 20/18 |
| | | | | 700/283 |
| 2015/0106196 | A1* | 4/2015 | Williams | G06Q 30/0253 |
| | | | | 705/14.51 |
| 2017/0274792 | A1* | 9/2017 | Vaughan | B60L 53/18 |
| 2018/0174393 | A1* | 6/2018 | Coussis | G06Q 20/18 |
| 2019/0318355 | A1* | 10/2019 | Chopra | G06Q 20/28 |
| 2020/0236175 | A1* | 7/2020 | Wang | G06Q 20/027 |
| 2020/0380477 | A1* | 12/2020 | Dunjic | B60L 53/665 |
| 2022/0051231 | A1* | 2/2022 | Laracey | G06Q 20/20 |
| 2023/0334495 | A1* | 10/2023 | Robertson | G06Q 20/326 |

\* cited by examiner

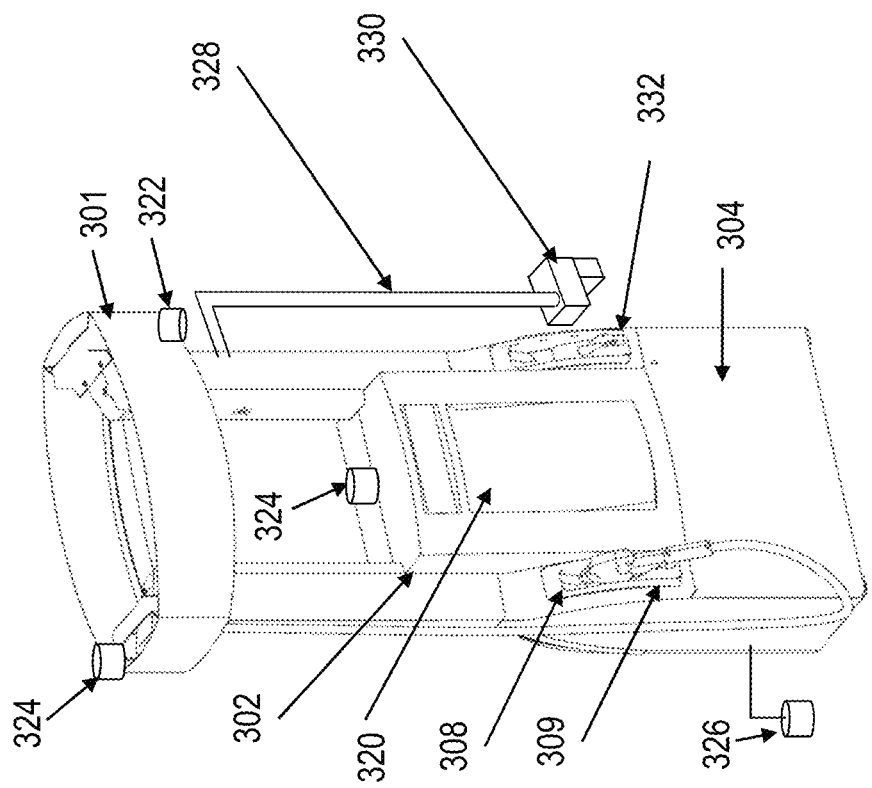
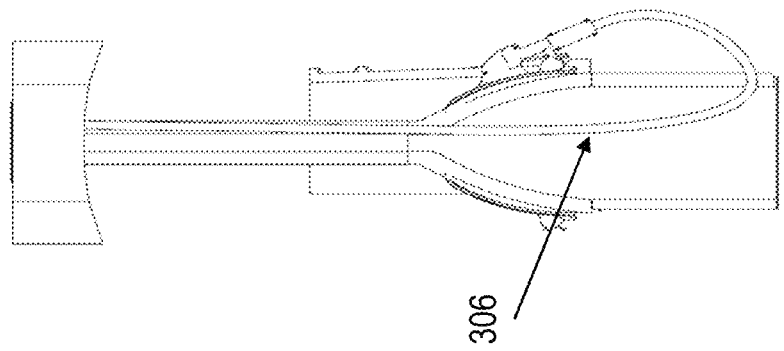
FIG. 3B
FIG. 3A

FUEL DISPENSER AUTHORIZATION AND CONTROL

FIELD

The current subject matter relates to methods and systems for authorizing use of a fuel dispenser and controlling operation of the fuel dispenser to dispense fuel.

BACKGROUND

Fuel dispensing systems can require network connectivity for data exchange with related computing systems. Fuel dispensing systems can be located in rural, remote, or less populated areas where network connectivity, such as local area networks, the internet, and cellular data access may not exist. Vehicles, such as those included in vehicle fleets, can require authorization prior to fueling a vehicle. Without network connectivity, electronically authorizing use and controlling operating fuel dispensing systems to fuel vehicles can be a significant challenge.

SUMMARY

Methods and systems for fuel dispenser authorization and control are provided. Related apparatus, techniques, and articles are also described.

In one aspect, a method for authorizing use of and controlling a fuel dispenser is provided. In an embodiment, the method can include establishing a first communication channel between a first computing device associated with a fuel dispenser user and a second computing device configured within a fuel dispenser. The method can also include receiving, by the second computing device, first data characterizing a first authorization of the fuel dispenser user of the fuel dispenser. The method can further include determining, by the second computing device, a second authorization of the fuel dispenser user based on the first data received via the first communication channel. The method can also include controlling, by the second computing device and based on the second authorization, operation of the fuel dispenser to dispense fuel. The method can further include providing, by the second computing device via the first communication channel, second data characterizing the operation of the fuel dispenser to the first computing device.

One or more of the following features can be included in any feasible combination. For example, the method can further include storing the second data on the first computing device and transmitting, by the first computing device, the second data to a third computing device via a second communication channel. In another example, the first data can be received from the third computing device when the first computing device is connected to the third computing device via a cellular data network or a local area network. In another example, the second authorization can be determined based on matching the first data with at least one authorization data value of a plurality of authorization data values preconfigured at manufacture in a memory of the second computing device.

In another example, the second data can include transaction data, fuel dispenser data, and/or fuel data. In another example, the transaction data can include an identifier of the fuel dispenser user, an account number, a vehicle identifier, an amount of the dispensed fuel, a cost of the dispensed fuel, and/or a transaction identifier. In another example, the fuel dispenser data can include at least one of usage data associated with operation of the fuel dispenser, error code data associated with operation of the fuel dispenser, or diagnostic data associated with operation of the fuel dispenser. In another example, responsive to determining the second authorization is invalid based on the first data, controlling operation of the fuel dispenser can also include controlling the fuel dispenser to operate in a protected mode configuration. In another example, the protected mode configuration can include at least one of controlling a number of dispensing operations, controlling an amount of dispensed fuel, or controlling a cost of the dispensed fuel. In another example, the first communication is a short-range wireless communication channel.

In another aspect, a system for authorizing use of and controlling a fuel dispenser is provided. In an embodiment, the system can include a fuel dispenser. The fuel dispenser can include a wireless transceiver, at least one data processor, and a memory storing a plurality of authorization data values and instructions configured to cause the at least one data processor to perform operations. The operations can include establishing a first communication channel with a first computing device associated with a fuel dispenser user. The operations can also include receiving first data characterizing a first authorization of the fuel dispenser user of the fuel dispenser. The first data can be received from the first computing device. The operations can further include determining a second authorization of the fuel dispenser user based on the first data received via the first communication channel. The operations can also include controlling operation of the fuel dispenser to dispense fuel based on the second authorization. The operations can further include providing second data characterizing the operation of the fuel dispenser to the first computing device via the first communication channel.

One or more of the following features can be included in any feasible combination. For example, the instructions can further cause the at least one data processor to store the second data on the first computing device and to transmit the second data from the first computing device to a third computing device via a second communication channel. In another example, the first data can be received from the third computing device when the first computing device is connected to the third computing device via a cellular data network or a local area network. In another example, the second authorization can be determined based on matching the first data with at least one authorization data value of the plurality of authorization data values preconfigured at manufacture in the memory.

In another example, the second data can include transaction data, fuel dispenser data, and/or fuel data. In another example, transaction data can include an identifier of the fuel dispenser user, an account number, a vehicle identifier, an amount of the dispensed fuel, a cost of the dispensed fuel, and/or a transaction identifier. In another example, the fuel dispenser data can include at least one of usage data associated with operation of the fuel dispenser, error code data associated with operation of the fuel dispenser, or diagnostic data associated with operation of the fuel dispenser. In another example, responsive to determining the second authorization is invalid based on the first data, the instructions can further cause the at least one data processor to control the fuel dispenser to operate in a protected mode configuration. In another example, the protected mode configuration can include at least one of controlling a number of dispensing operations, controlling an amount of dispensed fuel, or controlling a cost of the dispensed fuel. In another example, the first communication is a short-range wireless communication channel.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 3A is a side perspective view of one embodiment of a fuel dispenser;

FIG. 3B is a front perspective view of the fuel dispenser shown in FIG. 3A;

DETAILED DESCRIPTION

Figure 1:
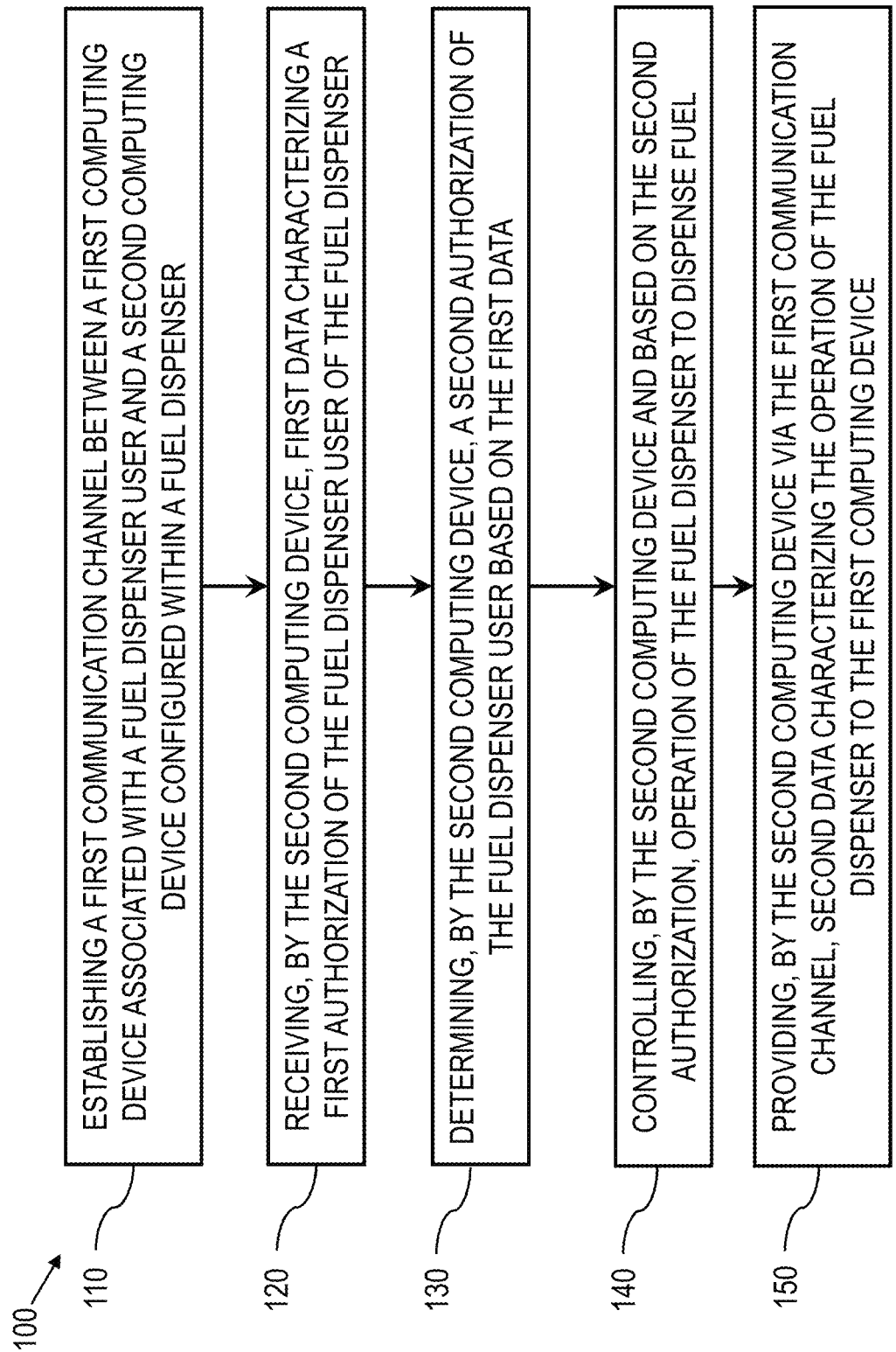
FIG. 1 is a process flow diagram illustrating an example process of some implementations of the current subject matter that can provide for fuel dispenser authorization and control.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Fuel dispensers can be located in remote areas that lack network connectivity, such as internet connectivity. As a result, it can be difficult for users of the fuel dispenser to electronically authorize their use and to control the fuel dispenser in these areas. Further, fuel dispenser operators may be unable to authenticate the users and control operation of the fuel dispenser as intended. The lack of network connectivity can reduce data exchanges, which provide robust reporting, control, and user verification associated with operation of a fuel dispenser.

In general, methods and systems for authorization and control of fuel dispensers which do not have network connectivity are provided. The system can include a wireless transceiver configured within the fuel dispenser and communicatively coupled to a computing device also configured within the fuel dispenser. A user can use a computing device, such as a smartphone, configured to communicate with the wireless transceiver of the fuel dispenser to receive authorization data allowing the user to operate the fuel dispenser. Authorization data can be stored in the computing device configured within the fuel dispenser and transmitted to the computing device of the user, thereby authorizing the user to operate the fuel dispenser. Data pertaining to the operation of the fuel dispenser by the authorized user can be stored on the user's computing device. When the user re-enters an area where network connectivity is available, the user's computing device can transmit the data associated with the user's operation of the fuel dispenser to other computing resources. In this way, a fuel dispenser operator can authorize fuel dispenser users to use fuel dispensers in remote areas which lack network connectivity and can receive data, such as transaction data or dispenser operation data.

Advantageously, the system and methods herein can enable fuel dispenser operators to deploy fuel dispensers in larger or remote areas, which may not include network connectivity and still maintain operational procedures and standards regarding transaction verification, data collection, and dispenser monitoring and control. As a result, operational costs can be reduced and the need for complex specialized network equipment or network deployments can also be reduced. User authorization can be performed easily without specialized equipment to be carried or manipulated by fuel dispenser users and thereby allowing users to have increased satisfaction using the fuel dispenser. Because the user can authorize their use of the fuel dispenser using their smartphone or similar personal computing device, fueling operations can be performed more efficiently by the user.

FIG. 1 is a process flow diagram illustrating an example process 100 of some implementations of the current subject matter that can provide for fuel dispenser authorization and control. At 110, a first communication channel can be established between a first computing device associated with a fuel dispenser user and a second computing device configured within a fuel dispenser. The fuel dispenser can include a computing device therein, which can be coupled to a wireless transceiver configured in or on the fuel dispenser. In some embodiments, the wireless transceiver can be a short-range wireless radio transceiver configured to communicate with computing devices via Bluetooth communication protocols. The first computing device can be a personal computing device, such as a smartphone or similar device, configured to communicate via short-range wireless radio communication methods (e.g., Bluetooth protocols), as well internet communication protocols via WiFi or cellular data networks. In some embodiments, the first computing device can include one or more applications configured to authorize and operate the fuel dispenser.

In some embodiments, a fuel dispenser user can log into to an application configured on a computing device they are carrying, such as computing device 230, to perform authorization to use a fuel dispenser located in an area lacking network connectivity. The user can initiate a transaction at the fuel dispenser via the application. Upon arrival at the fuel dispenser, the user can select data in the application such as a funding source or credit card number, a grade of fuel, and an identifier associated with the fuel dispenser. Once selected, the communication channel can be established between the user's computing device and the computing device configured within the fuel dispenser. The data including the funding source or credit card number, a grade of fuel, and an identifier associated with the fuel dispenser can be transmitted to the computing device within the fuel dispenser via the established communication channel. In addition, the application can generate a token for use in authorizing the user to use the fuel dispenser corresponding to the identifier selected by the user. The token can also be transmitted to the computing device within the fuel dispenser via the established communication channel with or separately from the data selected by the user in the application upon arriving at the fuel dispenser.

At 120, first data characterizing a first authorization of a user of a fuel dispenser can be received from the first computing device by the second computing device configured within the fuel dispenser. The first data can include data initiating a transaction to operate the fuel dispenser. The first data can be generated by one or more applications configured on the first computing device that is associated with the fuel dispenser user. For example, the first data can include authorization token data or the like that can be used to verify an identify and usage credentials of the fuel dispenser user. In some embodiments, the first data can be previously provided to a third computing device communicatively coupled to the first computing device via a cellular data network or a local area network. In such cases, the third computing device can provide the first data to the second computing device so as to preauthorize the first computing device associated with the fuel dispenser user in advance and upon establishment of the first communication channel.

In some embodiments, the first data and/or the first authorization can include authorization data values that can be associated with a user identifier, a credential level, a status of the user, a permission level of the user in regard to types, amounts, or frequency of fueling. The first authorization can include a verification of an identity of the fuel dispenser user or an authorization of the fuel dispenser user to operate the fuel dispenser. In some embodiments, the first authorization data can be acquired prior to the user reaching the fuel dispensing site. Once at the site, the first authorization data can be used to authorize the fuel dispenser at the fuel dispensing site. In some embodiments, the first authorization data can include pre-authorization data such as a token or credential information that is received from a remotely located server prior to authorization enabling the fuel dispenser to initiate fuel dispensing.

At 130, the second computing device within the fuel dispenser can determine a second authorization of the fuel dispenser based on the first data. For example, based on the first data and the first authorization, the second authorization can include an authorization of the fuel dispenser user to operate the fuel dispenser and/or to conduct a transaction to dispense fuel at the fuel dispenser. In some embodiments, the second authorization can be determined based on authorization data values that have been previously stored on the second computing device. For example, at manufacture or upon maintenance servicing, authorization data values can be uploaded to a memory of the second computing device and used to determine the second authorization. If authorization data values contained in the first data match or are within ranges of the stored authorization data values configured on the memory of the second computing device, the second authorization can be determined to be approved or valid and the fuel dispenser user is a valid or approved user of the fuel dispenser who can control the fuel dispenser to dispense fuel.

In some embodiments, responsive to determining the second authorization is invalid or not approved, based on failure to match authorization data values in the first data with those stored in the memory of the second computing device, use of the fuel dispenser can be further controlled to operate in a protected mode configuration. The protected mode configuration can provide a security mechanism by which limited or reduced operation of the fuel dispenser is enabled as a result of an invalid or unapproved authorization, e.g., a failed determination of the second authorization. The protected mode configuration can be configured to control a number of dispensing operations, control an amount of fuel dispensed, control a cost of fuel dispensed. For example, the protected mode configuration can limit a volume of fuel, a total cost of fuel, or a number of times fuel can be dispensed. In some embodiments, the protected mode configuration can be implemented for a specific time frame such as minutes, hours, days, or weeks.

At 140, the second computing device can control operation of the fuel dispenser based on the second authorization. For example, if the second authorization is approved or valid, the second computing device can control the fuel dispenser to dispense fuel. If the second authorization is denied or invalid, the second computing device can control the fuel dispenser so that fuel is not dispensed or is dispensed in a reduced or alternate mode (such as the protected mode configuration). Additional alternate modes of operation can be envisioned and can be associated with specific determinations of the second authorization and/or the first data received from the first computing device.

At 150, the second computing device can provide, via the first communication channel, second data characterizing the operation of the fuel dispenser. The second data can be provided to the first computing device where it can be stored or further transmitted. For example, the second data can be transmitted to a third computing device via a second communication channel, such as when the fuel dispensers computing device is able to regain network connectivity and the second data can be transmitted to the fuel dispenser operator or a third party.

The second data can include data associated with the operation of the fuel dispenser, such as transaction data, fuel dispenser data, or fuel data. The transaction data can be associated with the specific transaction and dispensing operation for which the fuel dispenser user was authorized at the fuel dispenser. The transaction data can include an identifier of the fuel dispenser user, an account number associated with a payment source, a vehicle identifier, an amount of the dispensed fuel, a cost of the dispensed fuel, and/or a transaction identifier. The fuel dispenser data can include data associated with operation or a configuration of the fuel dispenser. For example, the fuel dispenser data can include usage data associated with operation of the fuel dispenser, error code data associated with operation of the fuel dispenser, sensor data associated with one or more sensors coupled to the fuel dispenser, fuel supply data, fuel flow rate data, or diagnostic data associated with operation of the fuel dispenser, such as battery level data. In some embodiments, the second data can include alerts, notifications, or data indicating action is required to address a problem of the fuel dispenser.

Figure 2:
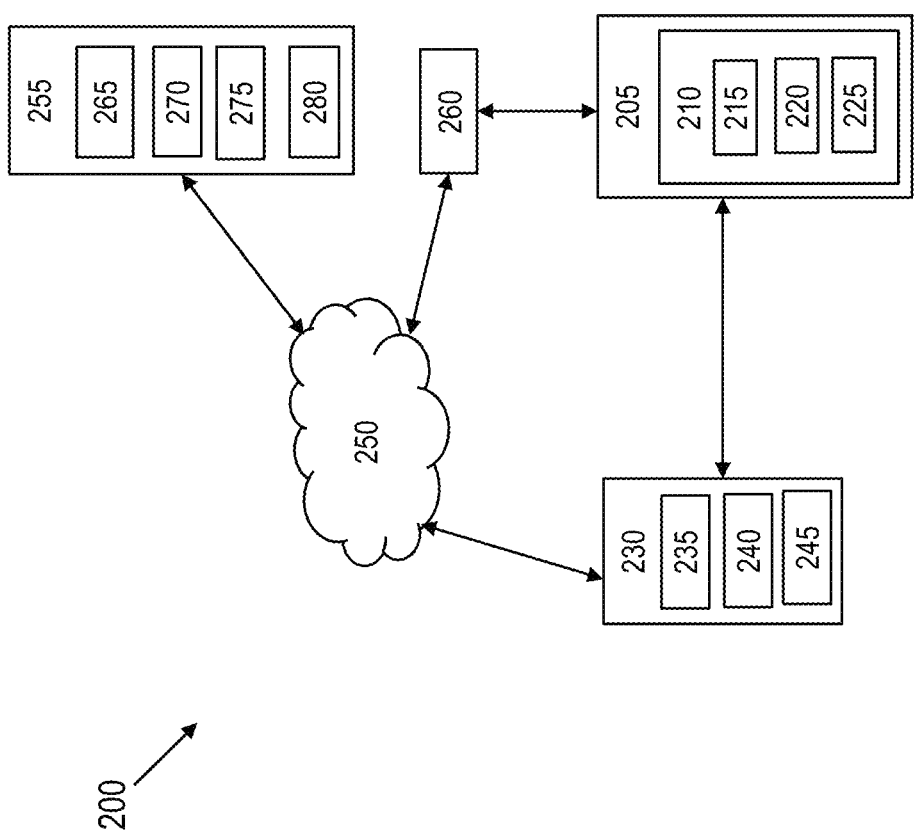
FIG. 2 is a system diagram illustrating an example system of some implementations of the current subject matter that can provide for fuel dispenser authorization and control.

FIG. 2 is a system diagram illustrating an example system 200 that incorporates some implementations of the current subject matter and that can provide for the same. As shown in FIG. 2, the system 200 includes a fuel dispenser 205 that is disposed in a fueling forecourt of a fueling station and configured to dispense fuel to a user of the fuel dispenser 205. The fuel dispenser 205 can include a computing device 210. The computing device 210 can include at least one data processor 215 configured to perform one or more aspects of the functionality described herein, and memory 220 for storing instructions for performing one or more aspects of the functionality described herein. The computing device 210 can also include an interactive display that is in operable communication with the at least one data processor 215 and that is configured to present electronic media to the fuel dispenser user. In some implementations, the computing device 210 can also include a wireless transceiver 225. The wireless transceiver can be a short-range wireless radio transceiver, such as a Bluetooth transceiver. The wireless transceiver 225 can be provided at a fuel dispenser 205 located in a region where there is no or limited network connectivity. In this way, the wireless transceiver 225 can allow a fuel dispenser user to authorize their use and control of the fuel dispenser 205 electronically.

In some implementations, as shown in FIG. 2, the system 200 can include a computing device 230 associated with, corresponding to, or in possession of the fuel dispenser user. The computing device 230 can include at least one data processor 235 configured to perform one or more aspects of the functionality described herein, and memory 240 for storing instructions for performing one or more aspects of the functionality described herein. The computing device 230 can also include a screen or display 245 that is in operable communication with the at least one data processor 235 and that is configured to present electronic media to the fuel dispenser user. In some implementations, the computing device 230 can be in operable communication with the fuel dispenser 205.

The computing device 230 can include one or more applications, stored in the memory 240 as computer executable instructions and executable by the processor 235. The one or more applications can provide functionality for a user of the fuel dispenser 205 to authorize their use of the fuel dispenser, control operation of the fuel dispenser, store data associated with operation of the fuel dispenser, and transmit data associated with operation of the fuel dispenser. For example, the one or more applications can be configured to receive transaction data associated with a sale of fuel dispensed by the fuel dispenser 205. The transaction data can be transmitted to a third party or other computing device when the computing device 230 regains network connectivity with a network, such as network 250. In some embodiments, the one or more applications can be configured to store and/or transmit sensor data acquired from the fuel dispenser 205.

As shown in FIG. 2, in some implementations, the system 200 can include a server 255 that is configured to perform operations that can enable one or more aspects of the fuel dispenser authorization and control described herein. The server 255 can include at least one data processor configured to perform one or more aspects of the functionality described herein, and memory for storing instructions for performing one or more aspects of the functionality described herein. As shown, the server 255 can be in operable communication with the computing device 210 configured within the fuel dispenser 205, the computing device 230 of the fuel dispenser user, and/or a network device 260 which may be communicatively coupled to the fuel dispenser 205 when network connectivity is available at the fuel dispenser 205. In conditions of limited or no network connectivity, the server 255 can be communicably coupled to the computing device 210 of the fuel dispenser 205 via the computing device 230 that is in possession of the fuel dispenser user and in proximity of the fuel dispenser 205.

As explained in further detail below, the server 255 can include several modules or programs of computer executable instructions performing one or more aspects of the subject matter described herein using the at least one data processor. For example, in some implementations, the server 255 can include an authorization module 260. The authorization module 265 can receive data from the computing device 230 associated with a fuel dispenser user and can determine if the fuel dispenser user (and the computing device 230) represent a valid and approved user of the system 200 that has permission to operate the fuel dispenser 205. In this way, the authorization module 260 can initiate a fuel sale transaction. The authorization module 265 can also be configured to generate authorization data values that can be provided to the fuel dispenser via the computing device 230 and/or the network device 260. The authorization data values can be used to authorize the fuel dispenser user based on data received from the computing device 230.

In some implementations, authorization data can include information about the fuel dispenser user that can be used to identify the fuel dispenser user and/or characteristics of the fuel dispenser user. For example, in some implementations, the authorization data can include image data acquired by an image sensor coupled to the fuel dispenser 205 that characterizes an image of the fuel dispenser user and/or the vehicle of the fuel dispenser user, and the identity of the fuel dispenser user can be determined by the authorization module 265 from the acquired image data using conventional image techniques (e.g., facial recognition, vehicle license plate number detection, and the like). In some implementations, the authorization module 265 can determine one or more demographic features of the fuel dispenser user (e.g., age, weight, height, disability status, and the like.) In some implementations, the authorization data can include wireless emission data acquired by a wireless transceiver coupled to the fuel dispenser 205 that characterize the wireless emissions of one or more devices associated with the fuel dispenser user (e.g., mobile computing device, wearable computing device, a dedicated multi-factor authentication device etc.), and the identity of the fuel dispenser user can be determined by the authorization from the acquired wireless emissions data present in the authorization data.

The server 255 can also include a finance module 270. The finance module 270 can store transaction data associated with operation of the fuel dispenser 205. For example, the finance module 270 can receive sale or transaction data from the computing device 230 associated with operation of the fuel dispenser 205 when the computing device 230 re-enters an area in which network connectivity is available. The finance module 265 can also store fuel price data that can be transmitted to the computing device 230 in regard to a transaction or operation of the fuel dispenser 205. In some embodiments, the finance module 270 can store fuel volume and fuel sale data associated with a fuel dispenser 250. The fuel volume and fuel sale data can include non-resettable tallies indicating cumulative, up-to-date, total volumes and total sales amounts of fuel dispensed from a dispenser 250.

The server 255 can also include a wetstock module 275. The wetstock module 275 can implement functionality and transmit, receive, or store data associated with the fuel supply associated with the fuel dispenser 205. The wetstock data can include fuel supply volumes, fuel type data, fuel tank location, fuel supply pipeline diagrams, fuel valve locations, or the like. The wetstock data can be acquired via sensors coupled to the fuel dispenser 205 and/or one or more components of the system for storing the fuel supply at a fueling station (e.g., an in-ground fuel storage tank located at the fueling station, etc.). In some embodiments, the wetstock module 275 can store wetstock data received from an automatic tank gauge that is wireless connected to the computing device 230. Wetstock data, such as wetstock inventory data can include tank volumes before a fuel sale transaction starts and after a fuel sale transaction has completed.

The server 255 can also include a dispenser data module 280. The dispenser data module 280 can implement functionality and transmit, receive, or store dispenser data associated with operation of the fuel dispenser 205. For example, the dispenser data can include amounts of fuel dispensed in a single dispensing operation (e.g., a single transaction), dispensing operations for a day, dispensing operations for a week, dispensing operations for a month, or the like. The dispenser data can include numbers of dispensing operations, timing of individual dispensing operations, or diagnostic data associated with operation of the fuel dispenser 205. The diagnostic data can include error or warning codes generated in response to operation or non-operation of the fuel dispenser 205. For example, the dispenser data can include indications of network connectivity available or lost at the fuel dispenser 205. In some embodiments, the dispenser data module 280 can also include fuel volume and fuel sale data associated with a fuel dispenser 250. The fuel volume and fuel sale data can include non-resettable tallies indicating cumulative, up-to-date, total volumes and total sales amounts of fuel dispensed from a dispenser 250.

Figure 4:
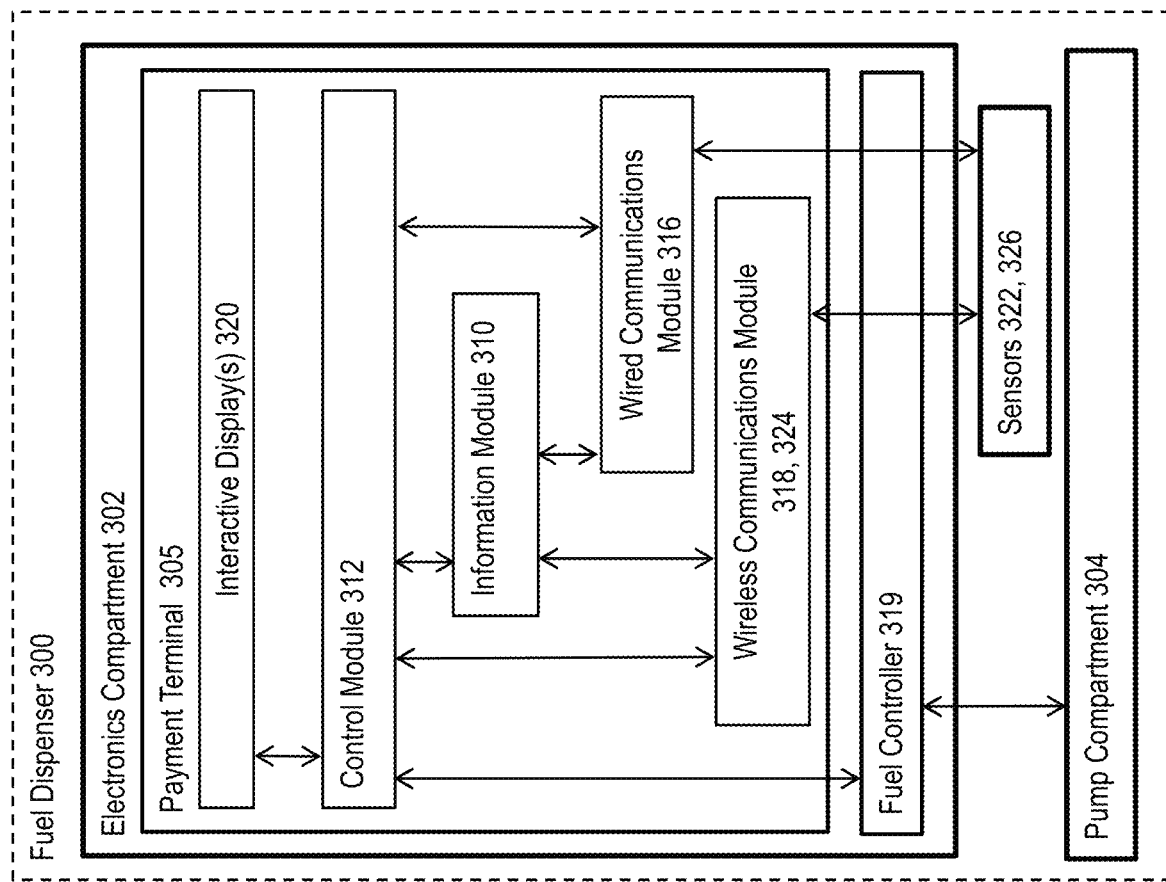
FIG. 4 is a diagram showing internal components of the fuel dispenser of FIGS. 3A and 3B.

FIGS. 3A and 3B illustrate one embodiment of a fuel dispenser 300 that can be used in some implementations of the current subject matter, and FIG. 4 illustrates components of the fuel dispenser. The fuel dispenser 300 can correspond to the fuel dispenser 205 described in relation to FIG. 2. In general, the dispenser 300 includes a dispenser body 301 having an electronics compartment 302, a pump compartment 304, and an image sensor 322. The pump compartment 304 houses a pump configured to pump fuel from a fuel tank or other reservoir, as well as one or more meters that can be configured to monitor fuel flow, flow of fuel additives, and/or flow of other components of the fuel. The pump compartment 304 can also include other components to facilitate fuel dispensing and mixing, such as motors and valves, a strainer/filtering system, a vapor recovery system, and the like. The pump compartment 304 is isolated from the electronics compartment 302 within the dispenser 300 to facilitate safety, security, and/or maintenance, as will be appreciated by a person skilled in the art. Fuel is thus not allowed to flow from the pump compartment 304 to the electronics compartment 302 and instead flows from the pump compartment 304 through hose 306 to a nozzle 308 for dispensing. As will be appreciated by a person skilled in the art, the nozzles 308 are each configured to dispense fuel from the dispenser 300 as pumped therefrom by the pump. The dispenser 300 also includes a nozzle receptacle 309 configured to store the nozzle 308 when not in use.

In some implementations, the dispenser 300 can be configured to dispense electricity and can include several components for dispensing the electricity. For example, dispenser 300 can include a wireless transceiver 324 positioned on the electronics compartment 302 or elsewhere on the dispenser 300, such as on the dispenser body 301. The wireless transceiver 324 can be communicably coupled to the wireless communications module 318. In some embodiments, the wireless transceiver 324 can be a Bluetooth wireless transceiver configured to exchange data with a computing device via short-range radio signals. In some embodiments, one or more sensors 326 can be coupled to the dispenser 300. For example, one or more sensors 326 can be configured in fuel tanks suppling fuel to the dispenser 300. The sensors 326 can include wired and wireless sensors.

In some implementations, the dispenser 300 can be configured to dispense electricity and can include several components for dispensing the electricity. For example, dispenser 300 can include a charging cable 328 coupled to the dispenser body 301 at one end and configured to deliver electricity to a charging connector 330 coupled to an opposite end. The charging connector 330 can be configured to couple to a charging port of a vehicle (not shown) and to deliver the electricity provided by the dispenser 300, via the charging cable 328, to the vehicle when coupled to the charging port. When not in use, the charging connector 330 can be stored in a charger receptacle 332 formed on the dispenser body 301.

The electronics compartment 302 houses electronics for facilitating payment for fuel and for controlling operation of the fuel dispenser to facilitating the dispensing of the fuel. For example, the electronics compartment 302 can include a fuel controller 319 that, at least in some implementations, includes a data processor, memory, and storage forming part of at least one computing system. The fuel controller 319 is configured to control dispensing of the fuel from the pump compartment 304. The electronics compartment 302 also includes a payment terminal 305 that is configured to provide a user with one or more options to create a desired fuel mixture, receive instructions characterizing the desired fuel mixture, receive payment information and/or user identification information from a user, transmit and receive the payment information and/or the user identification information with a POS system, and deliver fueling instructions to the fuel controller 319 to dispense fuel. The payment terminal 305 can also be configured to provide a user with information related to a status of fueling. For example, the payment terminal can display an amount of fuel that has been dispensed, and a corresponding fuel cost as the fuel mixture is dispensed.

The payment terminal 305 can be configured to facilitate communication between a user and the fuel controller 319, and can include an interactive display 320 and an information module 310. The information module 310 can, at least in some implementations include a data processor, memory, and storage, forming part of at least one computing system. The payment terminal 305 can also include one or more wired communication modules 316 and/or wireless communication modules 318 and a control module 312 that, at least in some implementations includes a data processor, memory, and storage, forming part of at least one computing system. The communication modules 316, 318 can function to allow data to be transmitted to and from various components within the payment terminal 305 via wired and/or wireless communication, respectively. For example, the communication modules 316, 318 can be configured to transmit and receive signals that can characterize, e.g., payment information, user identification information, and/or information regarding a desired fuel selection, via wired and/or wireless communications, respectively. The wireless communication module 318 can include, e.g., a transceiver for communicating via Bluetooth protocol (e.g., wireless transceiver 324), cellular protocol, WI-FI protocol, near field communication (NFC), and/or a radio frequency identification (RFID) protocol. Wired and/or wireless communication via the communication modules 316, 318 can be according to any of a variety of communication protocols, e.g., TCP/IP, etc., as will be appreciated by a person skilled in the art. The communication modules 316, 318 are also in operable communication with the image sensor 322 and are configured to receive image data acquired by the image sensor 322. The communication modules 316, 318 can additionally transmit the received image data for further external processing as described elsewhere herein.

The interactive display 320, which can be, or can include, a touchscreen. The interactive display 320 can be operably coupled to the control module 312 which can be used to control, dynamically rearrange, and/or update a graphical user interface (GUI) rendered on the display 320. The display 320 can be configured to show information (e.g., media content, fuel selection options, payment information, user identification information, etc.) in the form of one or more graphical elements, or graphical objects, receive input (e.g., instructions for a desired fuel mixture, user identification information, payment information, etc.) thereon, and can deliver data characterizing the input to the control module 312 to be processed. Some examples of information that the display 320 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a device that will consume the fuel, such as vehicle make, model, mileage, and the like. The user can also be provided with a recommend fuel blend which they can choose to select. The control module 312 can be further configured to receive from and/or control the one or more sensors 326.

To facilitate payment, the information module 310 can be configured to receive input such as, e.g., user identification information and/or payment information, and deliver the information to the control module 312. For example, the information module 310 can include a barcode and/or QR code scanner, and/or a NFC contactless card reader for receiving payment information and/or user identification information.

In some embodiments, the information module 310 be operably coupled to the image sensor 322 for acquiring images of facial features of the user, barcode and/or QR code information (e.g., to scan a loyalty rewards card), vehicle features (e.g., vehicle make, model, color, etc.), license plate number, non-facial body features, and the like, which can be used as user identification information. As another example, the information module 310 can include a palm reader and/or fingerprint reader which can scan a palm and/or finger of the user to obtain user identification information. In some embodiments, the user identification information can be associated with a loyalty rewards identifier automatically. Accordingly, in some embodiments, a pre-determined payment method, and user preferences, can be determined based on user identification information.

As shown in FIG. 4, the information module 310 can be operably coupled to the wired communication module 316 and/or the wireless communication module 318. The wired and wireless communication modules 316, 318 can allow the information module 310 to send and receive payment information and/or user identification information to and from a mobile device such as a smart phone, tablet, laptop, and the like, that is in electronic communication with the information module 310 via the wired and/or wireless communication modules 316, 318. Although the wireless communication module 318 is shown to be located within the payment terminal, the wireless communication module 318 can be located elsewhere on, within, or in the vicinity of, the fuel dispenser 300. For example, the wireless communication module 318 can be mounted on top of the fuel dispenser, which can facilitate retrofitting the wireless communication module 318 to existing fuel dispensers and/or facilitate repair, upgrade, or other maintenance of the communication module 318, as described in U.S. patent application Ser. No. 15/182,201 filed on Jun. 14, 2016 and entitled "Methods and Devices for Fuel Dispenser Electronic Communication."

Figure 5:
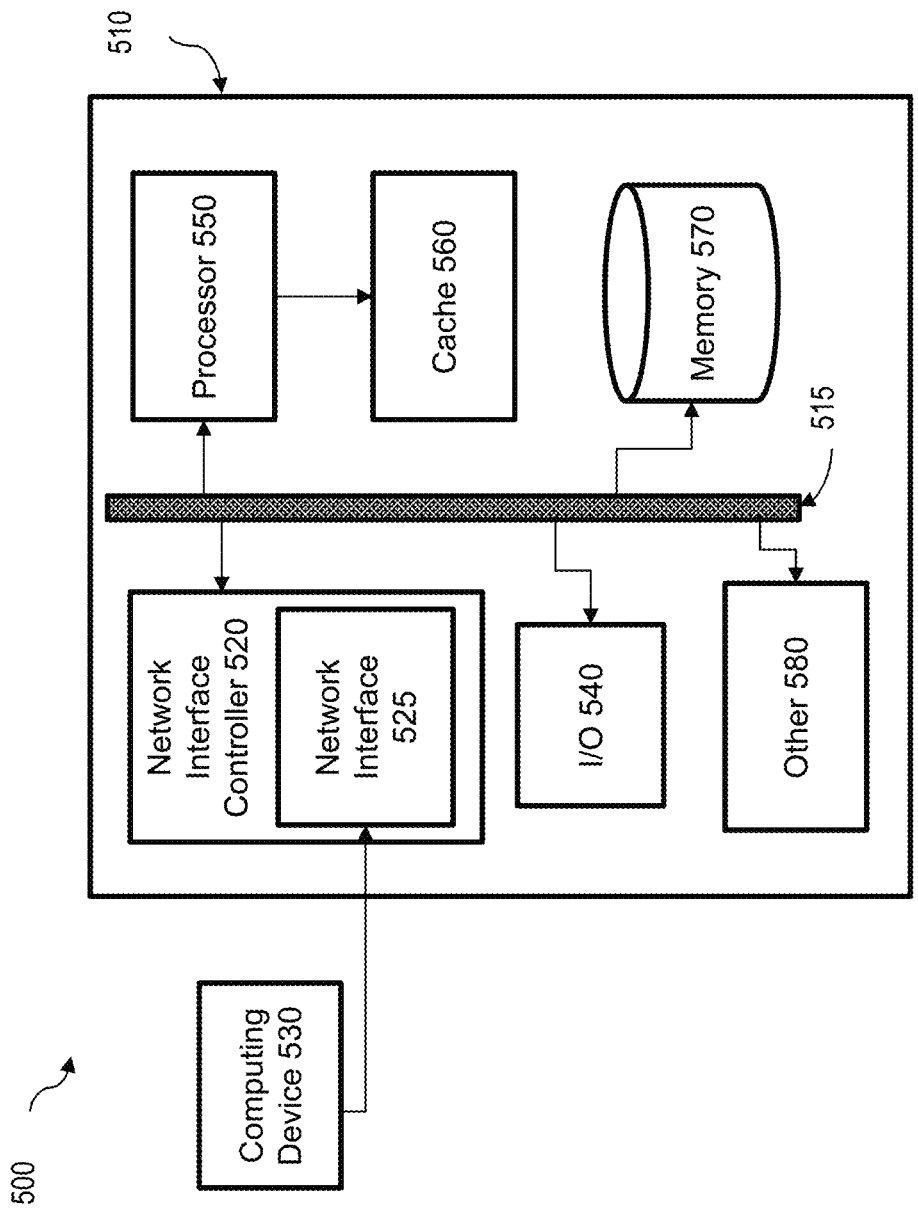
FIG. 5 is a block diagram of an exemplary computing system in accordance with an illustrative implementation of the fuel dispenser authorization and control system of FIG. 2.

FIG. 5 is a block diagram 500 of a computing system 510 suitable for use in implementing the computerized components described herein, such as a computing device 210 configured within the fuel dispenser 205 as shown in FIG. 2. In broad overview, the computing system 510 includes at least one processor 550 for performing actions in accordance with instructions, and one or more memory devices 560 and/or 570 for storing instructions and data. The illustrated example computing system 510 includes one or more processors 550 in communication, via a bus 515, with memory 570 and with at least one network interface controller 520 with a network interface 525 for connecting to external devices 530, e.g., a computing device (such as a computing device 230, or server 255). The one or more processors 550 are also in communication, via the bus 515, with each other and with any I/O devices at one or more I/O interfaces 540, and any other devices 580. The processor 550 illustrated incorporates, or is directly connected to, cache memory 560. Generally, a processor will execute instructions received from memory. In some embodiments, the computing system 510 can be configured within a cloud computing environment, a virtual or containerized computing environment, and/or a web-based microservices environment.

In more detail, the processor 550 can be any logic circuitry that processes instructions, e.g., instructions fetched from the memory 570 or cache 560. In many embodiments, the processor 550 is an embedded processor, a microprocessor unit or special purpose processor. The computing system 510 can be based on any processor, e.g., suitable digital signal processor (DSP), or set of processors, capable of operating as described herein. In some embodiments, the processor 550 can be a single core or multi-core processor. In some embodiments, the processor 550 can be composed of multiple processors.

The memory 570 can be any device suitable for storing computer readable data. The memory 570 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 510 can have any number of memory devices 570.

The cache memory 560 is generally a form of high-speed computer memory placed in close proximity to the processor 550 for fast read/write times. In some implementations, the cache memory 560 is part of, or on the same chip as, the processor 550.

The network interface controller 520 manages data exchanges via the network interface 525. The network interface controller 520 handles the physical, media access control, and data link layers of the Open Systems Interconnect (OSI) model for network communication. In some implementations, some of the network interface controller's tasks are handled by the processor 550. In some implementations, the network interface controller 520 is part of the processor 550. In some implementations, a computing device 510 has multiple network interface controllers 520. In some implementations, the network interface 525 is a connection point for a physical network link, e.g., an RJ 45 connector. In some implementations, the network interface controller 520 supports wireless network connections and an interface port 525 is a wireless Bluetooth transceiver. Generally, a computing device 510 exchanges data with other network devices 530, such as computing device 530, via physical or wireless links to a network interface 525. In some implementations, the network interface controller 520 implements a network protocol such as LTE, TCP/IP Ethernet, IEEE 802.11, IEEE 802.16, Bluetooth, or the like.

The other computing devices 530 are connected to the computing device 510 via a network interface port 525. The other computing device 530 can be a peer computing device, a network device, a server, or any other computing device with network functionality. For example, a computing device 530 can be a computing device 230 associated with a user of the fuel dispenser 205, a server 255, or a network device 260 as illustrated in FIG. 2. In some embodiments, the computing device 530 can be a network device such as a hub, a bridge, a switch, or a router, connecting the computing device 510 to a data network such as the Internet.

In some uses, the I/O interface 540 supports an input device and/or an output device (not shown). In some uses, the input device and the output device are integrated into the same hardware, e.g., as in a touch screen. In some uses, such as in a server context, there is no I/O interface 540 or the I/O interface 540 is not used. In some uses, additional other components 580 are in communication with the computer system 510, e.g., external devices connected via a universal serial bus (USB).

The other devices 580 can include an I/O interface 540, external serial device ports, and any additional co-processors. For example, a computing system 510 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 510, e.g., a touch screen on a tablet device. In some implementations, a computing device 510 includes an additional device 580 such as a co-processor, e.g., a math co-processor that can assist the processor 550 with high precision or complex calculations.

Exemplary technical effects of the methods, systems, apparatuses, and non-transitory machine readable storage mediums described herein include, by way of non-limiting example, configuring a fuel dispenser to electronically authorize and control fuel dispensing operations in remote areas where conditions of network unavailability can be prevalent. Providing wireless access to a fuel dispenser can enable more efficient and accurate self-authorization and control of the fuel dispenser by the fuel dispenser user. As a result, the need for complex network devices configured at the fuel dispenser can be eliminated. Operating costs of the fuel dispenser can be reduced because processing requirements and data storage has been migrated from computing devices configured in the fuel dispenser to remotely located computing devices accessible via a network.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method comprising:
    receiving, by a first computing device associated with a fuel dispenser user, first data characterizing a first authorization of the fuel dispenser user, the first data received as an input to an authorization application configured on the first computing device and associated with a fuel dispenser, the first data further comprising an identifier of the fuel dispenser selected by the fuel dispenser user via the authorization application, the input received prior to the first computing device being communicably coupled to the fuel dispenser;
    generating, by the authorization application, a token corresponding to the identifier of the fuel dispenser selected by the fuel dispenser user;
    establishing a first wireless communication channel between the first computing device and a second computing device configured within the fuel dispenser, the second computing device having a memory storing a plurality of authorization data values corresponding to the first data characterizing the first authorization of the fuel dispenser user;
    receiving, by the second computing device via the first wireless communication channel, the first data characterizing the first authorization of the fuel dispenser user and the generated token from the first computing device;
    determining, by the second computing device, a second authorization of the fuel dispenser user based on the first data and the plurality of authorization data values stored in the memory;
    controlling, by the second computing device and based on the second authorization, operation of the fuel dispenser to dispense fuel; and providing, by the second computing device via the first wireless communication channel, second data characterizing the operation of the fuel dispenser to the first computing device.

2. The method of claim 1, further comprising
storing the second data on the first computing device; and
transmitting, by the first computing device, the second data to a third computing device via a second wireless communication channel.

3. The method of claim 1, wherein the first data is received by the second computing device from a third computing device via a third wireless communication channel, the first data provided to the third computing device when the first computing device is connected to the third computing device via a cellular data network or a local area network.

4. The method of claim 1, wherein the second authorization is determined based on matching the first data with at least one authorization data value of the plurality of authorization data values stored in the memory of the second computing device, the plurality of authorization data values preconfigured at manufacture in the memory of the second computing device.

5. The method of claim 1, wherein the second data includes transaction data, fuel dispenser data, and/or fuel data.

6. The method of claim 5, wherein the transaction data includes an identifier of the fuel dispenser user, an account number, a vehicle identifier, an amount of the dispensed fuel, a cost of the dispensed fuel, and/or a transaction identifier.

7. The method of claim 5, wherein the fuel dispenser data includes at least one of usage data associated with operation of the fuel dispenser, error code data associated with operation of the fuel dispenser, or diagnostic data associated with operation of the fuel dispenser.

8. The method of claim 1, wherein responsive to determining the second authorization is invalid based on the first data, controlling operation of the fuel dispenser further comprises
controlling the fuel dispenser to operate in a protected mode configuration.

9. The method of claim 8, wherein the protected mode configuration comprises at least one of controlling a number of dispensing operations, controlling an amount of dispensed fuel, or controlling a cost of the dispensed fuel.

10. The method of claim 1, wherein the first wireless communication channel is a short-range wireless communication channel.

11. The method of claim 1, wherein the first computing device is a mobile computing device.

12. The method of claim 1, wherein the fuel dispenser is an offline fuel dispenser lacking network connectivity prior to establishing the first wireless communication channel.

13. A system comprising:
a fuel dispenser comprising:
a wireless transceiver;
at least one computing device configured within the fuel dispenser and communicably coupled to the wireless transceiver, the at least one computing device comprising:
at least one data processor; and
a memory storing a plurality of authorization data values characterizing authorization of a fuel dispenser user and instructions configured to cause the at least one data processor to perform operations comprising:
establishing, via the wireless transceiver, a first wireless communication channel with a first computing device associated with the fuel dispenser user, wherein the first wireless communication channel is established responsive to the first computing device being communicably coupled to the fuel dispenser, the first computing device including an authorization application associated with the fuel dispenser and to which first data characterizing a first authorization of the fuel dispenser user is received as an input to the authorization application prior to establishing the first wireless communication channel, the first data further comprising an identifier of the fuel dispenser selected by the fuel dispenser user via the authorization application;
receiving, from the first computing device via the first wireless communication channel, the first data characterizing the first authorization of the fuel dispenser by the fuel dispenser user and a token corresponding to the identifier of the fuel dispenser, the token generated via the authorization application;
determining a second authorization of the fuel dispenser user based on the first data and the plurality of authorization data values stored in the memory;
controlling operation of the fuel dispenser to dispense fuel based on the second authorization; and
providing second data characterizing the operation of the fuel dispenser to the first computing device via the first wireless communication channel.

14. The system of claim 13, wherein the instructions further cause the at least one data processor to
store the second data on the first computing device; and
transmit the second data from the first computing device to a third computing device via a second wireless communication channel.

15. The system of claim 13, wherein the first data is received by the second computing device from a third computing device via a third wireless communication channel, the first data provided to the third computing device when the first computing device is connected to the third computing device via a cellular data network or a local area network.

16. The system of claim 13, wherein the second authorization is determined based on matching the first data with at least one authorization data value of the plurality of authorization data values stored in the memory of the second computing device, the plurality of authorization data values preconfigured at manufacture in the memory.

17. The system of claim 13, wherein the second data includes transaction data, fuel dispenser data, and/or fuel data.

18. The system of claim 17, wherein the transaction data includes an identifier of the fuel dispenser user, an account number, a vehicle identifier, an amount of the dispensed fuel, a cost of the dispensed fuel, and/or a transaction identifier.

19. The system of claim 17, wherein the fuel dispenser data includes at least one of usage data associated with operation of the fuel dispenser, error code data associated with operation of the fuel dispenser, or diagnostic data associated with operation of the fuel dispenser.

20. The system of claim 13, wherein responsive to determining the second authorization is invalid based on the first data, the instructions cause the at least one data processor to control the fuel dispenser to operate in a protected mode configuration.

21. The system of claim 20, wherein the protected mode configuration comprises at least one of controlling a number of dispensing operations, controlling an amount of dispensed fuel, or controlling a cost of the dispensed fuel.

22. The system of claim 13, wherein the first wireless communication channel is a short-range wireless communication channel.

23. A method comprising:
  receiving, by a first computing device associated with a product dispenser user, first data characterizing authorization data associated with the product dispenser user, the first data received as an input to an authorization application configured on the first computing device and associated with a product dispenser, the first data further comprising an identifier of the product dispenser selected by the fuel dispenser user via the authorization application, the input received prior to the first computing device being communicably coupled to the product dispenser;
  generating, by the authorization application, a token corresponding to the selected identifier of the product dispenser;
  establishing a first wireless communication channel between the first computing device and a second computing device configured within the product dispenser, the second computing device having a memory storing a plurality of authorization data values corresponding to the first data characterizing the first authorization of the fuel dispenser user;
  receiving, by the second computing device via the first wireless communication channel, the first data characterizing the first authorization of the product dispenser user and the generated token from the first computing device;
  determining, by the second computing device, a second authorization of the product dispenser user based on the first data and the plurality of authorization data values stored in the memory;
  controlling, by the second computing device and based on the second authorization, operation of the product dispenser to dispense a product; and
  providing, by the second computing device via the first wireless communication channel, second data characterizing the operation of the product dispenser to the first computing device.

24. The method of claim 23, wherein the product dispenser is an electric vehicle charger configured to dispense electricity as the product.

* * * * *